United States Patent Office 3,658,944
Patented Apr. 25, 1972

3,568,944
PROCESS FOR THE PREPARATION OF IMPACT-RESISTING POLYSTYRENIC POLYMERS
Hiroshi Osuga and Isao Kaiho, Yokohama, and Hiroshi Shimizu, Kawasaki, Japan, assignors to Nihon Polystyrene Kogyo Kabushiki Kaisha, Kawasaki-shi, Kanagawa, Japan
No Drawing. Continuation of application Ser. No. 657,015, July 31, 1967. This application July 2, 1970, Ser. No. 56,115
Int. Cl. C08f 41/12
U.S. Cl. 260—876 R     6 Claims

ABSTRACT OF THE DISCLOSURE

Process for producing high impact resistant styrenic polymers comprising changing from bulk polymerization to suspension polymerization during polymerization wherein a small amount of a polybutadiene rubber or a styrene butadiene rubber is dissolved into 100 parts of a styrenic monomer, the system is polymerized insufficiently under bulk polymerization conditions to such extent that more than 2% by weight of the monomer is polymerized, but the polymerization is not completed, thereafter from 10 to 30 parts of a styrenic polymer having a molecular weight of from 80,000 to 300,000 is dissolved into the system in which a part of the monomer has been polymerized, the mixture is dispersed in water to provide a polymer suspension, and then the polymerization of the system is completed under the condition of suspension polymerization.

This application is a continuation of Ser. No. 657,015, filed July 31, 1967 now abandoned.

BACKGROUND OF THE INVENTION (1) Field of the invention

The present invention relates to a process of producing economically a polystyrenic polymer having excellent impact resistance by a method which is very easy in reaction control and operation and in a short period of time, as compared with conventional processes. In particular, the invention relates to a process of producing impact-resisting polystyrenic polymers by changing from bulk polymerization to suspension polymerization during polymerization wherein a small amount of a polybutadiene rubber or a styrene butadiene rubber is dissolved into 100 parts of a styrenic monomer, the system is polymerized insufficiently under bulk polymerization conditions to such extent that more than 2% by weight of the monomer is polymerized, but the polymerization is not completed, thereafter from 10 to 30 parts of a styrenic polymer having a molecular weight of from 80,000 to 300,000 is dissolved into the system in which a part of the monomer has been polymerized, the mixture is dispersed in water to provide a polymer suspension, and then the polymerization of the system is completed under the condition of suspension polymerization.

(2) Description of prior art

Hitherto, various attempts have been proposed to increase the impact strength of polystyrenic polymers. Among the most generally employed method is one in which a rubber-like material, such as a polybutadiene rubber is incorporated in a polystyrenic polymer. In regard to this process ways have been investigated to give effective impact strength to a polystyrenic polymer by the addition of a small amount of rubber to overcome undesirable difficulties caused by the presence of rubber. For this purpose, it has been known to be effective to conduct the polymerization, after dissolving a rubber-like material in a styrenic monomer to form an interpolymer.

Further, for forming the above-mentioned interpolymer, various known polymerization techniques can be employed. One useful method is bulk polymerization, but in this case it is not easy to remove the heat generated by the polymerization and control the reaction. These problems increase as the viscosity of the system increases with the progress of polymerization. Therefore, a process has been proposed in which a solution prepared by dissolving a small amount of a rubber in a styrenic monomer is insufficiently polymerized under conditions of bulk polymerization, and, then, the solution containing the polymer formed by the bulk polymerization of a part of the monomer is brought into the condition of suspension polymerization, whereby the polymerization is completed.

In the conventional process of producing an impact-resisting polystyrenic polymer by a bulk-to-suspension-polymerization system from 3 to 15 parts, preferably from 5 to 10 parts, of a rubber-like material is usually dissolved in 100 parts of a styrenic monomer and the bulk polymerization is conducted until the proportion of the polymerized component becomes from 20 to 50% preferably from 25 to 35%. This polymer content corresponds to from 8 to 48%, preferably from 14 to 33%, in conversion ratio of the monomer. In order to attain such a comparatively high polymerization ratio of monomer, the polymerization must be conducted for a long period of time while suffering the disadvantage that a considerably slow polymerization rate must be employed, since the reaction is not easily controlled, as mentioned above, if a specific polymerization apparatus is not employed. In particular, in the latter period of the bulk polymerization where the conversion ratio of polymerization is increased, a solution having a very high viscosity must be treated. Hence, stirring efficiency is remarkably reduced and heat conductivity is lowered, which makes the reatcion condition even more inconvenient.

SUMMARY OF THE INVENTION

The inventors have studied ways for commercially producing polystyrenic polymers having excellent impact strength by overcoming the difficulties of reaction control and unprofitability of operation and installation in conventional methods. As the result thereof, it has been found that in the production of an impact-resisting polystyrenic polymer by a bulk-suspension polymerization system, a polystyrenic polymer having excellent properties can be prepared without being accompanied by the aforesaid difficulties by stopping the bulk polymerization when the conversion ratio of monomer is higher than 2% but before the completion thereof, usually when the conversion ratio is less than 50%, and adding to the system a separately prepared styrenic polymer having a molecular weight of from 80,000 to 300,000, whereby the reaction condition is changed to the condition of suspension polymerization and the polymerization of the system is completed under such conditions. That is, according to the process of this invention, the solution treated therein has a significantly low viscosity, which helps stirring, and has a good heat conductivity. Hence the polymerization under the bulk polymerization can be conducted by a profitable condition.

DETAILED DESCRIPTION OF THE INVENTION

In order to increase the effect of the formation of interpolymers by conventional methods, a high conversion ratio of monomer is required as mentioned above. This reason is not sufficiently clear but may be explained as follows. That is, the belief that for improving the impact resistance of a polystyrenic polymer and providing thereto good workability by using a rubber-like material, the rubber-like material must be present in the resin as a dispersion of gel particles having a proper grain size has been supported by a relatively large number of persons. According to this consideration, as the formation of a polymer in a monomer solution having dissolved therein a rubber-like material by the bulk polymerization, the rubber-like material causes a phase to be separated in the solution and to be deposited as fine particles. In the case of completing the polymerization by the subsequent suspension polymerization, if a solution is subjected to the suspension polymerization while the viscosity of the solution is low, the phase separation of the rubber-like material progresses further to cause a macro-gelation, whereby the particles of the rubber-like material will grow into an inadequately large size. Therefore, for maintaining the size of the particles of the rubber-like material in a proper range, the viscosity of the solution to be suspension polymerized must be very high. It is also very important to maintain the size of the particles of the rubber-like material in a proper range for preventing the surface gloss of articles of the polymer from being lost.

In the inventors' studies, there has been observed a fact supporting this consideration. That is, when a polybutadiene rubber was dissolved in styrene and the state of the solution was observed by means of a phase-contrast microscope, while polymerizing under conditions of bulk polymerization by a conventional method, many fine black points were observed when 1–2% of the monomer was coverted into polymer after the initiation of the polymerization. Since by a phase-contrast microscope, a solution having a higher refractive index is observed to be darker, the black points thus observed stand for the monomer in which the styrene polymer has been dissolved. As the polymerization progresses, the black points are increased in number and grow in aggregation, but they are present as a discontinuous phase. Further, it was observed that the styrene solution of the rubber existed as a clear and continuous phase, but when the conversion ratio of the monomer into polymer reached 15–20%, the continuous phase was cut partially by the growth of the dark phase to form an amorphous phase. Further, when the conversion ratio reached 20–25%, the phase was cut finer to form granular particles having a comparatively uniform grain size, which were dispersed in a dark continuous phase.

On the other hand, when the addition of polystyrene was conducted to the point of 5% in conversion ratio into polymer according to the process of this invention and the system was observed by a phase-contrast microscope, although innumerable fine black points and very large amorphous dark points had floated in the clear continuous phase before the addition of polystyrene, the continuous phase was immediately cut finely by the addition thereof to form comparatively uniform fines spherical particles, which were dispersed in the dark phase. This demonstrates that the course of the polymerization in the conventional method from 5% to 25% in conversion ratio was concluded in a very short period of time.

In a conventional method, in order to obtain a viscosity of solution necessary for depositing fine rubber particles and maintaining them at a suitable size, the bulk polymerization was conducted to a high conversion ratio into polymer. However, the inventors have found that by increasing the vicsosity of the solution in which the polymer has been dissolved to an extent almost same as that attained by continuing the bulk polymerization by adding from 10 to 30 parts of a separately prepared styrenic polymer to the system in which a part of the styrenic monomer has been polymerized, better results than those by a conventional method can be very easily obtained without being accompanied by the faults of conventional methods, as mentioned above.

The inventors have also studied about the case where a solution of a styrenic monomer containing a rubber-like material is directly subjected, without applying bulk polymerization, with the addition of a styrenic polymer to suspension polymerization. However, the results of the observation by a phase-contrast microscope showed that although the number of black points immediately formed by the addition of the polymer was less, since they grew very rapidly, there existed relatively less uneven large dark phases in the system with the addition thereof and when the clear and continuous phase was cut by increasing the addition amount of the polymer, there were formed considerably large and uneven particles which were not refined. Thus, the rubber particles became remarkably large and uneven in size, the separation into two phases easily occurred in the suspension polymerization step after bulk polymerization, and, even if the polymerization could be conducted without accompanied by the phase separation, the impact strength of the polymer product and the surface gloss of the article of the polymer product were insufficient.

Therefore, in the process of this invention, it is considered that many fine black points formed by the polymerization of a monomer in a comparatively low conversion ratio were grown and increased rapidly by the incorporation of a styrenic polymer to finely cut the solution phase of rubber, whereby small and uniform rubber particles can be formed and hence in the process of this invention, the polymerization under the condition of bulk polymerization is inevitable for forming many fine black points.

By styrenic monomers in this invention are meant besides styrene, an α-substituted styrene, such as, α-methtylstyrene, one or more nucleus substituted styrenes, such as, o-methylstyrene and p-chlorostyrene, and a mixture of the above-mentioned monomer and a small amount of a material capable of being copolymerized with it, such as, acrylonitrile, methyl methacrylate and butadiene.

The amount of a polybutadiene rubber or a butadiene-styrene rubber to be dissolved into the styrenic monomer is suitably from about 3 to 15% by weight, most preferably from 5 to 10% by weight based on the weight of the styrenic monomer.

The proportion of the styrenic monomer to be converted into polymer under the condition of bulk polymerization is required to be more than 2% by weight, but may be less than about 50%, and usually less than from 8 to 12% by weight. A high conversion ratio of more than 20 to 25% is undesirable since the merits obtained by the process of this invention will be reduced.

After the insufficient polymerization of the monomer under the condition of bulk polymerization, styrenic polymer is added and dissolved into the solution in an amount of from 10 to 30% by weight preferably from 15 to 25% by weight based on the weight of the initial styrenic monomer. By the styrenic polymer in this invention is meant a polymer obtained from the aforesaid styrenic monomer or a mixture thereof. The polymer may be prepared by bulk polymerization, suspension polymerization, or any known method and the molecular weight of the polymer may be selected within a range of from 80,000 to 300,000 according to the uses of final products. The addition amount of the styrenic polymer is determined in the above-mentioned range according to the conversion ratio of the monomer into polymer so as to conduct the dispersion and deposition of rubber particles in a desired state. The addition of the styrenic polymer may be conducted as the particles or powders of the polymer or as a solution of the polymer in a styrenic monomer.

At the bulk polymerization in the process of this invention there may be used a polymerization initiator, if desired. In this case, there may be used an organic peroxide series initiator, such as, dibenzoyl peroxide, di-t-butyl peroxide and dilauroyl peroxide. However, in the case of conducting the polymerization at a high temperature, the addition of a polymerization initiator is generally unnecessary or, on the contrary, better results are frequently obtained when a polymerization initiator is not employed.

Further, by conducting the suspension polymerization in the presence of a composite one of the polymerization initiator which can be used in the bulk polymerization, the impact resistance of the polymer can be improved. Although the reason is not fully understood, it may be explained as follows. That is, in order that the presence of a rubber-like material in a polystyrenic polymer may contribute to the improvement of the impact resistance and the moldability of the polymer, it is necessary that the rubber-like material be dispersed in the polymer as particles having proper size and shape. Such a state of dispersion is realized by the styrenic monomer being graft-polymerized to the rubber-like particles and by the rubber-like material being in a gelled state. The graft polymerization and the gelation are influenced by the conditions of the graft polymerization of styrenic polymer particularly the kind of initiator and by using the above-mentioned composite initiator, a desirable graft polymerization can be obtained as compared with the use of conventional initiators. That is, it may be considered that the difference between the composite initiator used in this invention and a conventional initiator, such as, dibenzyl peroxide or dilauroyl peroxide results mainly in the difference in structures of free radicals formed from them and the free radicals formed from the the combination of t-butyl perisobutyrate and t-butyl peracetate in the aforesaid ratio does not cause excessive graft polymerization.

As mentioned above, according to the process of this invention, in the production of an impact-resisting polystyrenic polymer by a bulk suspension polymerization system, the proportion of the monomer to be converted into polymer by the bulk polymerization may be markedly low and hence it is possible to reduce remarkably the time of the bulk polymerization which is conducted with a relatively low polymerization speed. Moreover, since the viscosity of the solution to be treated is comparatively low, the reaction can be easily controlled and the bulk polymerization can be carried out with a comparatively high polymerization speed, whereby the reaction period can be further reduced.

Even though the styrenic polymer to be added and dissolved into the solution on which bulk polymerization has been conducted must be prepared additionally, and, further, there remains a large amount of monomer to be polymerized in the subsequent suspension polymerization, the styrenic polymer may be prepared by any desired method and the resolution of the polymer into the monomer can be conducted very rapidly. This, it will be easily understood by persons skilled in the art that the process of this invention has a high industrial profitability as compared with a conventional method in which the bulk polymerization must be conducted under the unfavorable conditions. Moreover, it is an important advantage of this invention that the equipment for controlling the temperature of bulk polymerization may be simple.

It will become more apparent from the following examples that the polystyrenic polymers obtained by the process of this invention have excellent properties.

The invention will now be explained by the following examples, in which percent and part(s) are by weight.

EXAMPLE 1

A mixture having the following composition was charged in a reaction chamber and the polymerization thereof was conducted for one hour at 115° C. while stirring;

|  | Parts |
|---|---|
| Styrene monomer | 100 |
| Polybutadiene rubber (Diene 35 NF [1]) | 7 |
| Hardened wax (cetyl sebacate) | 2 |
| n-Butyl stearate | 2 |
| n-Dodecylmercaptan | 0.002 |

[1] Made by Firestone Tire & Rubber Co.

The polymerization ratio of styrene was 5.5%. Into the solution was dissolved 17 parts of polystyrene having a molecular weight of 150,000 at 80° C. to form an aqueous suspension have the following composition:

|  | Parts |
|---|---|
| Polymer solution | 100 |
| Water | 100 |
| Dibenzoyl peroxide | 0.20 |
| t-Butyl perbenzoate | 0.25 |
| t-Dodecylmercaptan | 0.06 |
| Tri-calcium phosphate | 0.2 |
| Sodium dodecylbenzene sulfonate | 0.001 |
| Polyvinyl alcohol | 0.03 |

The polymerization was conducted while increasing the temperature from 80° C. gradually to 140° C. finally and after 8 hours the suspension polymerization was completed. When the polymer thus obtained was molded by means of a hot press and the properties were measured, the Izod impact strength was 1.92 ft.-lb./in.-notch, the flowing characteristics of it by a melting-type viscometer 1.42 g./10 min. (200° C., load 2.16 kg.), the softening temperature by a Koka-type flow tester was 95° C.

EXAMPLE 2

A mixture having the following composition was charged in a reaction chamber and the polymerization was conducted for 1.5 hours at 115° C. while stirring:

|  | Parts |
|---|---|
| Styrene monomer | 100 |
| Polybutadiene rubber (Diene 35 NF) | 7 |
| Hardened wax (cetyl sebacate) | 4 |
| n-Dodecylmercaptan | 0.03 |

The polymerization ratio of the styrene was 8.5%. Into the solution was dissolved 17 parts of the polystyrene as in Example 1 and an aqueous suspension having the following composition was prepared:

|  | Parts |
|---|---|
| Polymer solution | 100 |
| Water | 100 |
| Dibenzoyl peroxide | 0.25 |
| t-Butyl perbenzoate | 0.25 |
| t-Dodecylmercaptan | 0.25 |
| Tri-calcium phosphate | 0.2 |
| Sodium dodecylbenzene sulfonate | 0.001 |
| Polyvinyl alcohol | 0.03 |

The properties of the polymer thus obtained were 1.74 ft.lb./in.-notch in Izod impact strength, 1.70 g./10 min. in flowing characteristics, and 96° C. in softening temperature.

EXAMPLE 3

A composition having the following composition was polymerized in a reaction chamber for 2 hours at 115° C.:

| | Parts |
|---|---|
| Styrene monomer | 100 |
| Polybutadiene rubber (Diene 35 NF) | 7 |
| Hardened wax | 2 |
| n-Butyl stearate | 2.5 |
| n-Dodecylmercaptan | 0.03 |

The polymerization ratio of styrene was 11.8%. Into the solution was dissolved 17 parts of polystyrene having a molecular weight of 100,000 and an aqueous suspension having the following composition followed by the suspension polymerization as in Example 1:

| | Parts |
|---|---|
| Polymer solution | 100 |
| Water | 100 |
| Dibenzoyl peroxide | 0.2 |
| t-Butyl perbenzoate | 0.25 |
| t-Dodecylmercaptan | 0.06 |
| Tri-calcium phosphate | 0.2 |
| Sodium dodecylbenzene sulfonte | 0.001 |
| Polyvinyl alcohol | 0.03 |

The properties of the polymer thus prepared were 1.85 ft.-lb./in.-notch in Izod impact strength, 1.75 g./10 min. in flowing characteristics, and 95° C. in softening temperature.

EXAMPLE 4

A mixture having the following composition was polymerized in a reaction chamber for one hour at 115° C.

| | Parts |
|---|---|
| Styrene monomer | 100 |
| Polybutadiene rubber (Diene 35 NF) | 7 |
| n-Butyl stearate | 4 |
| n-Dodecylmercaptan | 0.02 |

The polymerization ratio of styrene was 5.5%. Into the solutuion was dissolved 16 parts of polystyrene having a molecular weight of 150,000 and an aqueous suspension having the following composition was prepared:

| | Parts |
|---|---|
| Water | 120 |
| t-Butyl isobutyrate | 0.21 |
| t-Butyl peracetate | 0.26 |
| t-Dodecylmercaptan | 0.07 |
| Tri-calcium phosphate | 0.2 |
| Sodium dodecylbenzene sulfonate | 0.001 |
| Polyvinyl alcohol | 0.03 |

The suspension polymerization was conducted for one hour at 85° C., for 1.25 hours at 95° C., for 1.5 hours at 100° C., for one hour at 110° C., for 1.5 hours at 120° C., for one hour at 135° C., and for 0.75 hour at 145° C. When the synthetic resin thus obtained was molded and the properties were measured, the Izod impact strength was 2.22 ft.-lb./in.-notch, the flowing characteristics by a melting-type viscometer 1.2 g./10 min. (200° C., load 2.16 kg.), and the softening temperature by a Koka-type flow tester 95° C.

Comparative examples

For comparison, according to a conventional process, a mixture having the following composition was polymerized in a reaction chamber at 115° C.:

| | Parts |
|---|---|
| Styrene monomer | 100 |
| Polybutadiene rubber (Diene 35 NF) | 7 |
| Hardened wax | 2 |
| n-Butyl stearate | 2.5 |
| n-Dodecylmercaptan | 0.1 |

In this case, it took longer than 5 hours to attain 30% of polymerization ratio. Thereafter, an aqueous suspension having the following composition was prepared from the solution followed by suspension polymerization as in Example 1:

| | Parts |
|---|---|
| Polymer solution | 100 |
| Water | 100 |
| Dibenzoyl peroxide | 0.24 |
| t-Butyl perbenzoate | 0.30 |
| t-Dodecylmercaptan | 0.06 |
| Tri-calcium phosphate | 0.2 |
| Sodium dodecylbenzene sulfonate | 0.001 |
| Polyvinyl alcohol | 0.03 |

The properties of the polymer thus obtained were 1.54 ft.-lb/in.-notch in impact strength, 1.81 g./10 min. in flowing characteristics, and 92° C. in softening point.

We claim:

1. In a process for preparing an impact-resisting polystyrenic polymer by a sequential bulk/suspension polymerization system which comprises:
   (a) dissolving a small amount of a member selected from the group consisting of a polybutadiene rubber and a styrene butadiene rubber into 100 parts by weight of a styrenic monomer and polymerizing the resulting solution under conditions of bulk polymerization until a certain weight of the monomer is polymerized,
   (b) dissolving 10–30 parts by weight of a styrenic polymer having a certain molecular weight into the partially polymerized solution resulting from stop (a), and
   (c) dispersing the resulting solution from step (b) in water to form a polymer-containing suspension and then polymerizing the resulting suspension under conditions of suspension polymerization to complete the polymerization, the improvement comprising:
     (1) conducting the bulk polymerization to such an extent that more than 2% but less than 8% by weight of the monomer is polymerized, and wherein the styrenic polymer dissolved in said partially polymerized system during step (b) has a molecular weight of from about 80,000 to about 300,000.

2. The process as claimed in claim 1 wherein said suspension polymerization is conducted in the presence of from 0.1 to 1.0 part by weight of t-butyl per-isobutyrate and 0.01 to 0.5 part by weight of t-butyl peracetate, based on the weight of the styrenic monomer.

3. The process as claimed in claim 1 wherein the amount of said polybutadiene rubber or said butadiene-styrene rubber is from about 5 to about 10%, by weight, based on the weight of said styrenic monomer.

4. The process of claim 1 wherein an organic peroxide series initiator is utilized during said bulk polymerization.

5. The process as claimed in claim 1 wherein the amount of the member selected from the group consisting of a polybutadiene rubber and a styrene butadiene rubber which is dissolved into the styrenic monomer is from about 3 to 15% by weight.

6. The process of claim 1 wherein said styrenic monomer is selected from the group consisting of styrene, α-methyl styrene, o-methyl styrene and p-chloro styrene.

References Cited

UNITED STATES PATENTS 3,330,786 7/1967 Finestone et al.
3,284,542 11/1966 Carrock et al.

SAMUEL H. BLECH, Primary Examiner

C. J. SECCURO, Assistant Examiner

U.S. Cl. X.R.

260—23.7 H, 23.7 R, 28.5 B, 29.7 UP, 880 R